United States Patent
Huang

(10) Patent No.: US 6,637,878 B2
(45) Date of Patent: *Oct. 28, 2003

(54) EYEWEAR FRAME WITH AUXILIARY FRAME HAVING DISTANTLY ARRANGED MAGNETS

(76) Inventor: David Huang, D20 Lungcheung Villa, Fuyong, Bo An District, Shenzhen, Guangdong (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/114,630

(22) Filed: Apr. 2, 2002

(65) Prior Publication Data

US 2002/0140897 A1 Oct. 3, 2002

(30) Foreign Application Priority Data

Apr. 2, 2001 (TW) .......................... 90205072 U

(51) Int. Cl.7 ................................................ G02C 9/00
(52) U.S. Cl. .......................................... 351/47; 351/57
(58) Field of Search ............................ 351/47, 48, 57, 351/58, 41, 44

(56) References Cited

U.S. PATENT DOCUMENTS

| | | | |
|---|---|---|---|
| 5,568,207 A | 10/1996 | Chao | 351/57 |
| 5,682,222 A | 10/1997 | Chao | 351/111 |
| 5,737,054 A | 4/1998 | Chao | 351/47 |
| 5,786,880 A | 7/1998 | Chao | 351/41 |
| 5,877,838 A | 3/1999 | Chao | 351/47 |
| 5,882,101 A | 3/1999 | Chao | 351/47 |
| 5,883,688 A | 3/1999 | Chao | 351/47 |
| 5,883,689 A | 3/1999 | Chao | 351/47 |
| 5,896,185 A | 4/1999 | Huang | 351/63 |
| 5,929,964 A | 7/1999 | Chao | 351/47 |
| 5,975,691 A | 11/1999 | Ku | 351/47 |
| 6,012,811 A | 1/2000 | Chao et al. | 351/47 |
| 6,017,119 A | 1/2000 | Huang | 351/63 |
| 6,053,611 A | 4/2000 | Ku | 351/47 |
| D428,253 S | 7/2000 | Huang | D3/265 |
| 6,089,708 A | 7/2000 | Ku | 351/47 |
| 6,092,896 A | 7/2000 | Chao et al. | 351/47 |
| 6,139,142 A | 10/2000 | Zelman | 351/57 |
| 6,158,860 A | 12/2000 | Huang | 351/136 |
| 6,315,408 B1 | 11/2001 | Huang | 351/128 |
| 6,352,342 B1 | 3/2002 | Huang | 351/47 |

*Primary Examiner*—Hung Xuan Dang
(74) *Attorney, Agent, or Firm*—Ladas & Parry

(57) ABSTRACT

The present invention discloses an eyewear comprising an auxiliary frame and a main frame which are magnetically connected to each other. In a preferred embodiment, the auxiliary frame comprises an auxiliary lens retaining mechanism for accommodating a pair of auxiliary lenses; and an attachment mechanism resiliently and pivotably joined to the auxiliary lens retaining mechanism. The attachment mechanism is provided with an auxiliary magnetic apparatus for magnetically coupling to a corresponding main magnetic apparatus on the main frame. In a more preferable embodiment, the present invention utilizes the nature of resilience of a resilient sheet to allow the main frame to be selectively stopped at different angular orientations during its pivotal action with respect to the auxiliary frame.

7 Claims, 4 Drawing Sheets

EYEWEAR FRAME WITH AUXILIARY FRAME HAVING DISTANTLY ARRANGED MAGNETS

FIELD OF INVENTION

This invention is related to an eyewear, and more particularly to a main and an auxiliary eyewear each having magnets at lens retaining mechanisms thereof for attachment.

BACKGROUND OF INVENTION

Auxiliary frames with lenses have been used for decades to augment deficiencies in main frames. For example, the auxiliary frames may be for magnifying purposes, or may transform the main frames into sunglasses.

For decades, people around the world have been creating numerous ingenious methods to attach the auxiliary frames onto the main frames. In one line of approaches, the auxiliary frames are clipped onto the lenses of the main frames. Not only do such clips obstruct the wearer's vision, they may scratch the lenses of the main frames. To alleviate the defect of view obstruction, there are designs using small clips at the edges of the frames. However, these small clips still create scratches on the lenses and the main frames; and attaching these auxiliary frames with small clips requires some maneuvering with two hands, and it would not be easy to do so, for example, if one is driving. Also, to detach such an auxiliary frame from its main frame, one typically have to push down at its bridge and warp the frames outward on both sides of the lenses. It is not uncommon for such actions to permanently deform the auxiliary frame.

Another approach uses two pairs of magnets instead of clips, with one pair on the main frame and the other on the auxiliary frame. The magnets are located on the plane of the lenses, and are close to the temples of the frames. Since they are on the plane of the lenses, they have to be carefully designed so that they can blend into the general style of the frame, without being too conspicuous. One way is to make the magnets very small. With gravity pulling the auxiliary frame away from its main frame, the magnets have to be of certain size so as to have sufficient magnetic power to hold the auxiliary frame to the main frame.

One reason for the magnets to be close to the temples is that the pair of magnets on a frame should be as far apart as possible. This is to ensure the auxiliary frame to be right over the main frame, not only at the locations close to the bridges of the frames, but also at the locations close to the arms of the frames. However, in order to have sufficient coupling power, the magnets on the auxiliary frame have to match in both locations and orientations to the magnets on the main frame. This is not an easy task especially because the magnets are typically very small for stylistic reasons.

The further away the pair of magnets are on a frame, the more difficult it is to align them in both locations and orientations to magnets on another frame. First, imagine the magnets in a main frame are slightly off in locations from those in an auxiliary frame. Since the magnets are quite small, slight misalignment in the locations would significantly reduce magnetic coupling between the frames. Next, imagine one small magnet in the main frame is different in orientation from its corresponding magnet in the auxiliary frame. This can happen, for example, if the auxiliary frame has been slightly twisted—the magnitude of the difference is proportional to the distance between the pair of magnets on the frame. Two magnets may not even be able to couple together if they have different orientations. Misalignment in locations or orientations not only adversely affects the coupling power of the auxiliary frame to the main frame, but also creates an unpleasant outward appearance for the wearer, especially when the auxiliary frame is tilted relative to the main frame.

Another defect with providing the magnets on the temples is that, means cannot be provided to allow the auxiliary frames to flip up, such that the user must remove the auxiliary frames when one does not intend to use the auxiliary frames. There is a higher probability that the user will lose the auxiliary frames by removing the auxiliary frames from the main frames.

To solve the above problems, one solution is to provide attachment mechanisms on nose bridges of the main and auxiliary frames, where the attachment mechanism may include a single pair of magnets on the nose bridges of the main and auxiliary frames such that a flipping mechanism may be added to the auxiliary frames, as disclosed in U.S. Pat. No. 6,089708. However, the attachment mechanisms provided on the nose bridges along result in a weaker structure and unsteady attachment between the main and auxiliary frames than the attachment mechanisms provided on at least two distant locations of the eyewear.

It should be apparent from the foregoing that there is a need for improved apparatus to attach auxiliary frames to main frames so that auxiliary frames can be easily, firmly and elegantly attached to main frames and allowing flipping of the auxiliary frame if needed.

SUMMARY OF INVENTION

The present invention provides apparatus to easily, firmly and elegantly attach auxiliary frames to main frames, based on magnets at the lens retaining mechanisms of the auxiliary eyewear. The invention has numerous advantages. For example, it creates a very strong support for attaching auxiliary frames to main frames by providing a pair of distant magnets on an attachment mechanism of the auxiliary frames, it is relatively easy to manufacture, it is easier to blend into the general design of frames, and it makes the auxiliary frames easily applicable to main frames even with just one hand.

In one embodiment, the auxiliary frames are of a simple construction that can be directly attached to or removed from the main frames.

In a further embodiment, the auxiliary frames are provided with a pivotal shaft allowing the user to flip up the auxiliary frames when one no longer needs the auxiliary frames.

Not only is the present invention more elegant, easier to design, easier to manufacture and more secure in attachment than prior art approaches; a person can easily use one hand to attach an auxiliary frame onto a main frame of the present invention.

The above and other features and advantages of the present invention will become apparent from the accompanying drawings and the following descriptions.

DETAILED DESCRIPTIONS OF EMBODIMENTS

Figure 1:
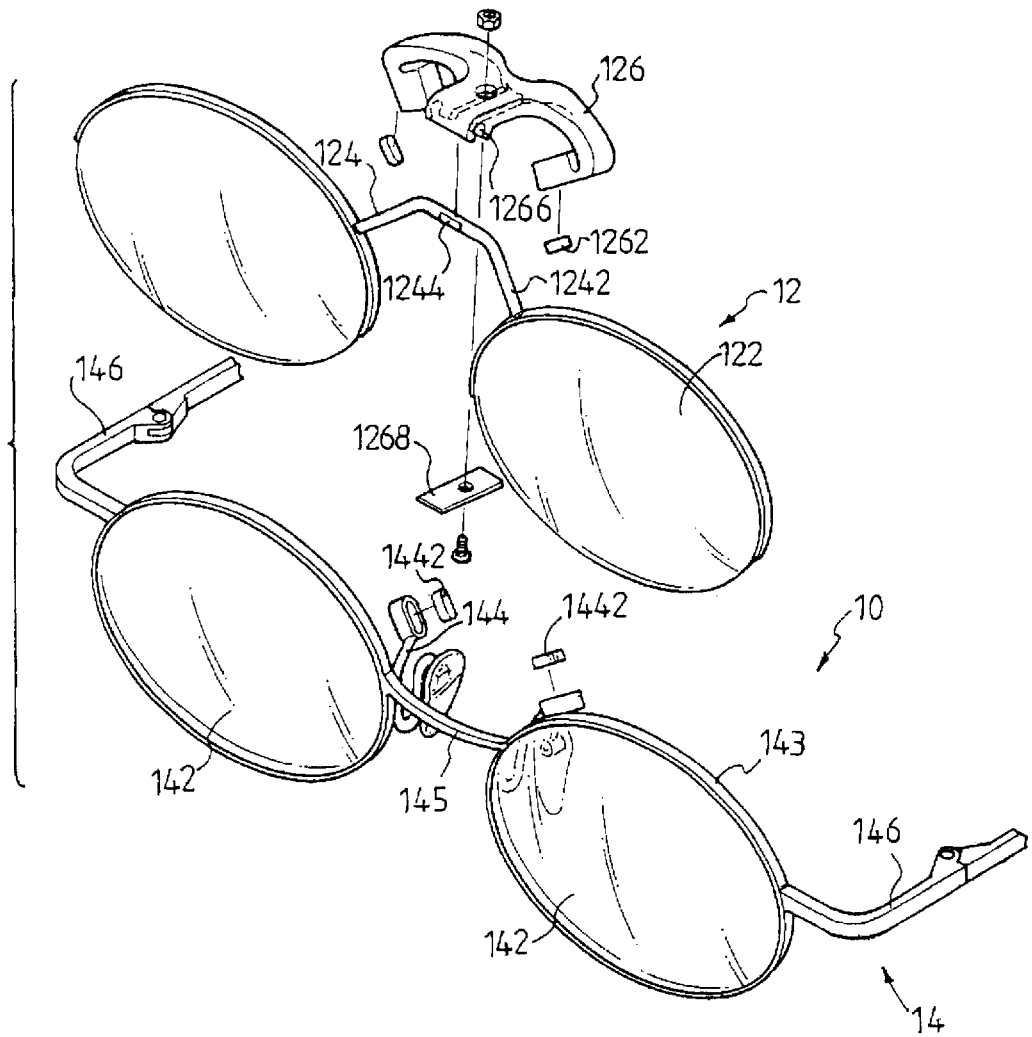
FIG. 1 shows a perspective, exploded view of an embodiment of the present invention.
Figure 2:
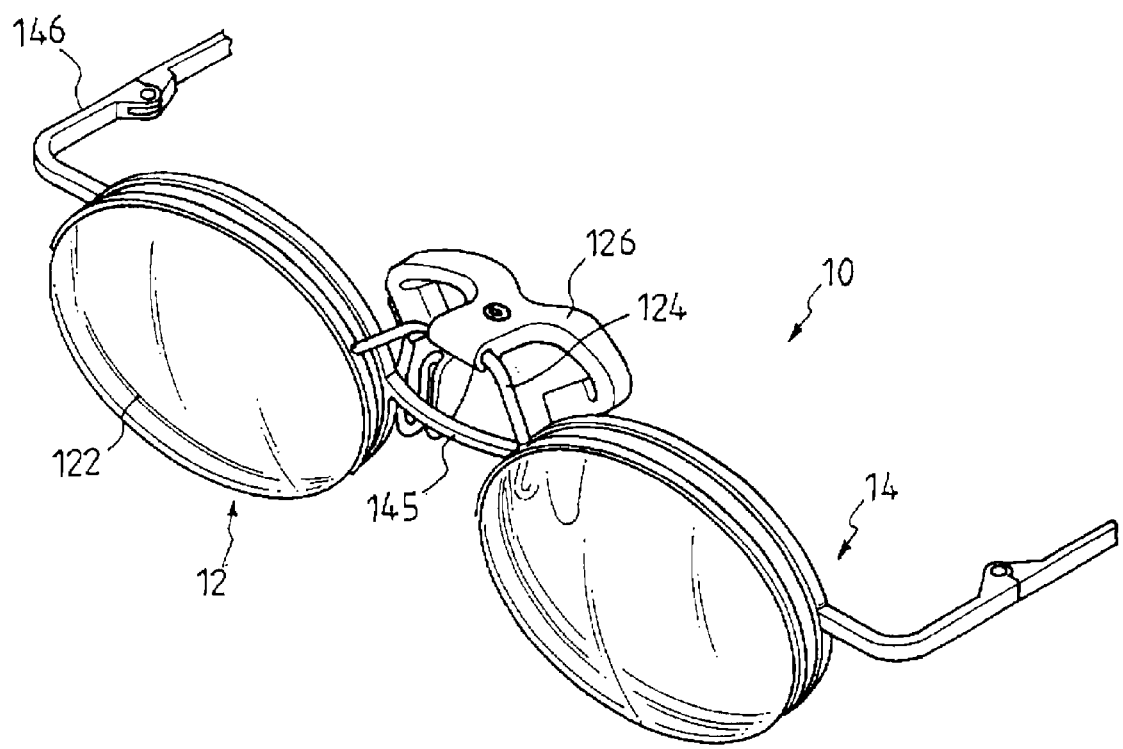
FIG. 2 shows a perspective, assembled view of the embodiment in FIG. 1.
Figure 5:
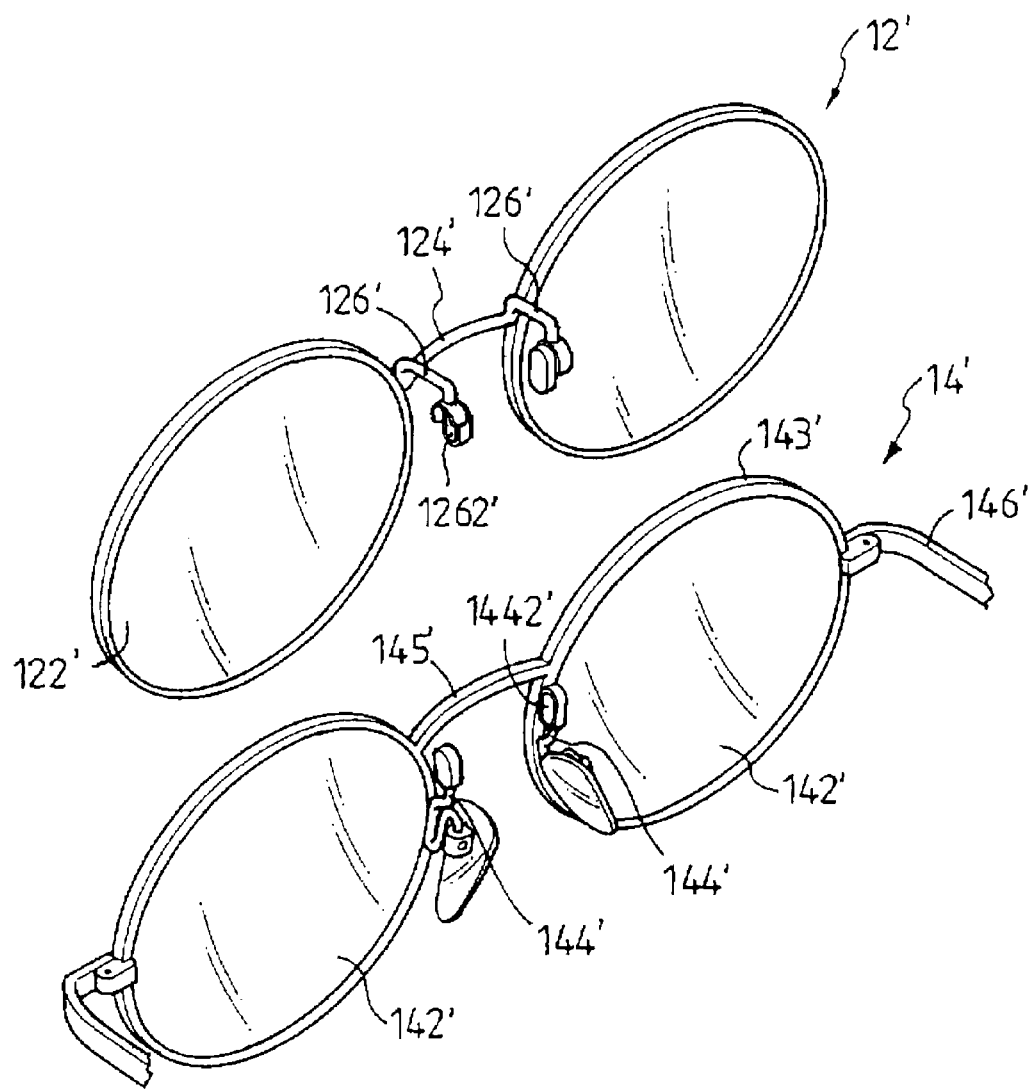
FIG. 5 is a modified embodiment of FIG. 2, in which the extension member or members extend from a portion of main lens retaining mechanism at locations near the wearer's nose during wear.

As shown in FIGS. 1 and 2 and an alternative embodiment in FIG. 5, the eyewear 10, 10' comprises an auxiliary frame 12, 12' and a main frame 14, 14' which are magnetically connected to each other.

The auxiliary frame 12, 12' comprises an auxiliary lens retaining mechanism 124, 124' for accommodating a pair of auxiliary lenses 122, 122' thereto, and an attachment mechanism 126, 126', wherein the attachment mechanism 126, 126' comprises an auxiliary magnetic apparatus preferably in the form of a pair of auxiliary magnets 1262, 1262'.

In the embodiment shown in FIGS. 1 and 2, the auxiliary lens retaining mechanism 124 includes a pivotal shaft 1242. The pivotal shaft 1242 is formed with a stopping feature preferably in the form of stopping facets 1244 around its peripheral edge. The attachment mechanism 126 is resiliently and pivotably joined to the auxiliary lens retaining mechanism 124, which includes a length-wise groove 1266 and a resilient sheet 1268 to allow the pivotal shaft 1242 of the auxiliary lens retaining mechanism 124 to be pivotably clamped therebetween.

As shown in FIGS. 1 and 5, the main frame 14, 14' comprises a pair of main lenses 142, 142', a main lens retaining mechanism 143, 143', a single or preferably a pair of extension members 144, 144', a nose bridge 145, 145', and a pair of temples 146, 146', wherein the extension member or members preferably extend from a portion of main lens retaining mechanism at locations near the wearer's nose during wear, best illustrated in the extension members 144' of a main frame 14' shown of FIG. 5.

As further shown in FIGS. 1 and 5, the main frame 14, 14' further comprises a main magnetic apparatus preferably in the form of a pair of laterally distant main magnets 1442, 1442' preferably disposed at the ends of extension members 144, 144' for magnetically coupling to the auxiliary magnets 1262, 1262'.

Figure 3:
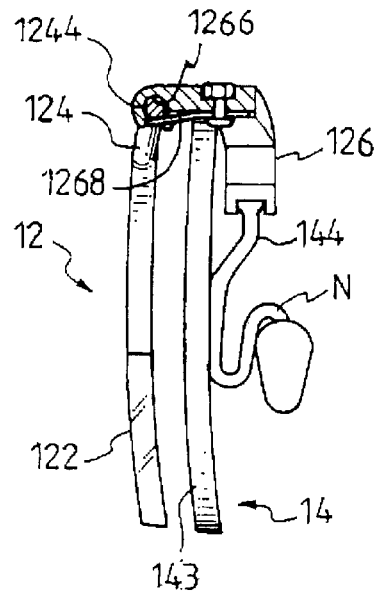
FIG. 3 is an explanatory view of FIG. 2, in which the auxiliary frame is in a position covering the main lens.
Figure 4:
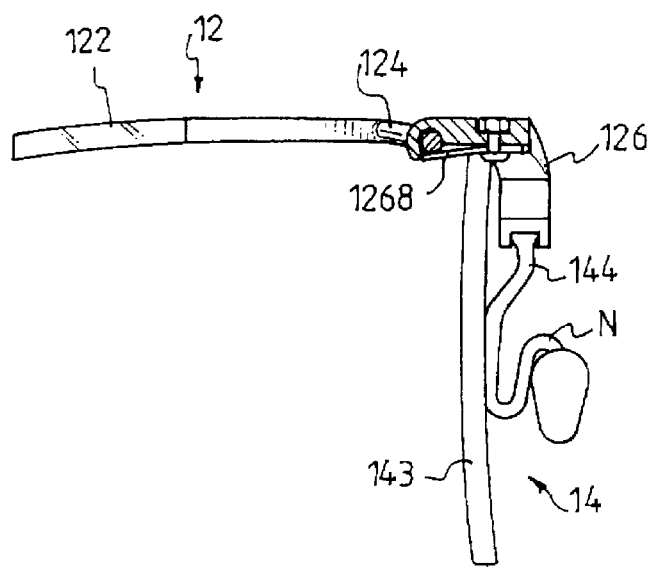
FIG. 4 is an explanatory view of FIG. 2, in which the auxiliary frame is in a position lifted above the main lens.

In use, the auxiliary magnets 1262, 1262' of the attachment mechanism 126, 126' of the auxiliary frame 12, 12' are magnetically coupled to the main magnets 1442, 1442' of the main frame 14, 14'. The attachment mechanism 126, 126' for containing the auxiliary magnets 1262, 1262' is preferably in the form of a stretching peg that may straddle over the main lens retaining mechanism 143, 143' when the auxiliary frame is coupled to the main frame, best shown in FIGS. 3 and 4. As such, the auxiliary frame 12, 12' may be attached to the main frame 14, 14' in a steady manner with the auxiliary magnets 1626, 1262' being coupled to the main magnets 1442, 1442' at laterally distant locations.

Further, in the embodiment of FIGS. 1–4, the pivotal shaft 1242 is pivotably inserted and clamped between the length-wise groove 1266 and resilient sheet 1268. When the auxiliary frame 12 is lifted up or down, the pivotal shaft 1242 is rotated following the movement of the auxiliary frame 12. Thereby, the resilient sheet 1268 can resiliently stop the pivotal shaft 1242 at a particular angular orientation as long as it mates with or couples to the stopping feature/stopping facets 1244. If the stopping feature is in the embodiment of stopping facets, the auxiliary frame 12 can be selectively stopped at different angular orientations during the pivotal movement of the pivotal shaft 1242. See FIGS. 3 and 4.

Magnets used in this invention are selected to have sufficient magnetic power to couple the frames together. In the present invention, a magnet can be a permanent magnet or a magnetizable element, such as iron or magnetizable stainless steel. For better magnetic coupling, at least one of the magnets must be a permanent magnet. If both paired magnets on the main and auxiliary frames are permanent magnets of opposite polarity at their coupling surfaces, the strength in magnetic coupling will be enhanced.

Different embodiments in the present invention can be combined in different ways. For example, many known, conventional flip-up arrangement, such as that implemented in U.S. Pat. No. 6,089,708, may be implemented to allow flip-up of the auxiliary frame. Also, it should be obvious to those skilled in the art to come up with the methods of building each embodiment. This specification will not further describe different fabrication techniques.

While the present invention has been particularly described with respect to preferred embodiments thereof, persons skilled in the art will understand that the above and other changes in form and detail may be made without departing from the scope and spirit of the invention. It is intended that the specification and examples be considered as exemplary only, with the true scope and spirit of the invention being indicated by the following claims.

What is claimed is:

1. Eyewear frame with auxiliary frame, comprising:
   a main frame comprising:
      I) a main lens retaining mechanism for accommodating a pair of main lenses; and
      II) a pair of laterally distant main magnets disposed at a pair of extension members extending from a portion of said main lens retaining mechanism at locations near a wearer s nose; and
   an auxiliary frame for being attached to said main frame, comprising:
      I) an auxiliary lens retaining mechanism for accommodating a pair of auxiliary lenses and comprising a pivotal shaft formed with a stopping feature around its peripheral edge; and
      II) an attachment mechanism resiliently and pivotably joined to the auxiliary lens retaining mechanism, and including:
         A) a pair of distant auxiliary magnets for magnetically coupling to said pair of main magnets; and
         B) a length-wise groove and a resilient sheet for pivotably clamping the pivotal shaft therebetween, wherein the stopping feature is matable with the resilient sheet to stop pivotal movement of the pivotal shaft between the length-wise groove and resilient sheet.

2. The eyewear according to claim 1, wherein the stopping feature is in the form of stopping facets, so that, during the pivotal movement of the pivotal shaft, the auxiliary frame can be selectively stopped at different angular orientations.

3. An eyewear, comprising:
   an auxiliary frame comprising:
      an auxiliary lens retaining mechanism for accommodating a pair of auxiliary lenses; and
      an attachment mechanism provided with a pair of auxiliary magnets; and
   a main frame comprising:
      a main lens retaining mechanism for accommodating a pair of main lenses;

a pair of extension members extending from a portion of main lens retaining mechanism at locations near the wearer's nose during wear, said extension members accommodating a pair of main magnets for magnetically coupling to the auxiliary magnets.

4. The eyewear frame according to claim 3, wherein the attachment mechanism having the auxiliary magnets includes stretching pegs that straddle over the main lens retaining mechanism when the auxiliary frame is coupled to the main frame.

5. The eyewear frame according to claim 3, wherein:

the auxiliary lens retaining mechanism comprises a pivotal shaft formed with a stopping feature around its peripheral edge, and the attachment mechanism includes a length-wise groove and a resilient sheet so as to pivotably and resiliently clamp the pivotal shaft therebetween, pivotal movement of the pivotal shaft being stopped as the resilient sheet resiliently mates with the stopping feature.

6. The eyewear frame according to claim 5, wherein the stopping feature has stopping facets, so that, during the pivotal movement of the pivotal shaft, the auxiliary frame can be selectively stopped at different angular orientations.

7. An attachment mechanism for use with eyewear frame with auxiliary frame comprising a substantially T-shaped body formed with a pair of distant ends for crossing across and above the nose of a wearer during wear and a third end, wherein each of said pair of distant ends accommodates a magnet, and a third end that is formed with a length-wise groove includes a resilient sheet for pivotably clamping a pivotal shaft of said auxiliary frame therebetween.

* * * * *